United States Patent
Hernandez et al.

(10) Patent No.: US 6,527,336 B2
(45) Date of Patent: Mar. 4, 2003

(54) POP-UP TRAILER

(76) Inventors: Mark S. Hernandez, 800 Cottman Ave., Apt. A125, Philadelphia, PA (US) 19111; Ira Jaffe, 1120 Princeton Ave., Philadelphia, PA (US) 19111

( * ) Notice: Subject to any disclaimer, the term of this patent is extended or adjusted under 35 U.S.C. 154(b) by 1 day.

(21) Appl. No.: 09/875,247

(22) Filed: Jun. 6, 2001

(65) Prior Publication Data

US 2002/0185889 A1 Dec. 12, 2002

(51) Int. Cl.[7] ............................. B60P 3/06; B60P 3/355
(52) U.S. Cl. .................................... 296/181; 296/26.05
(58) Field of Search ............................... 296/158, 181, 296/180.01, 100.02, 26.04, 901, 26.05, 26.03, 168–173, 175, 176

(56) References Cited

U.S. PATENT DOCUMENTS

| | | | |
|---|---|---|---|
| 3,140,116 A | 7/1964 | Speas | |
| 3,319,994 A | 5/1967 | Smock | |
| 3,323,778 A | * 6/1967 | Baker | 296/26.05 |
| 3,506,300 A | * 4/1970 | Remmert | 296/171 |
| 3,694,024 A | 9/1972 | Linville | |
| 3,721,467 A | * 3/1973 | Kerr | 296/183 |
| 3,811,721 A | * 5/1974 | Bolesky | 296/901 |
| 4,206,943 A | 6/1980 | Friedenberg | |
| 4,392,682 A | * 7/1983 | Norkus, Jr. | 296/181 |
| 4,856,843 A | 8/1989 | Elliott | |
| 4,982,971 A | * 1/1991 | Marin | 296/181 |
| 5,058,946 A | * 10/1991 | Faber | 296/181 |
| 5,088,785 A | 2/1992 | Lee | |
| 5,114,202 A | 5/1992 | Johnson | |
| 5,383,703 A | * 1/1995 | Irvine, III | 296/181 |
| 5,505,515 A | * 4/1996 | Turner | 296/173 |
| 5,681,074 A | * 10/1997 | Christensen | 296/181 |
| 5,769,485 A | * 6/1998 | Bontrager et al. | 296/171 |
| 5,951,096 A | * 9/1999 | Steury et al. | 296/171 |
| 5,992,117 A | * 11/1999 | Schmidt | 52/582.1 |
| 6,186,580 B1 | * 2/2001 | Nothem et al. | 296/181 |
| 6,196,604 B1 | * 3/2001 | Hoh et al. | 296/26.05 |
| 6,206,456 B1 | * 3/2001 | Steury et al. | 296/173 |
| 6,213,539 B1 | * 4/2001 | Williams et al. | 296/181 |

\* cited by examiner

*Primary Examiner*—D. Glenn Dayoan
*Assistant Examiner*—Gregory Blankenship
(74) *Attorney, Agent, or Firm*—Duane Morris LLP

(57) ABSTRACT

A utility trailer includes a base frame with wheels attached and a cap. The cap is moveable between a first position in which the bottom of the cap is in sealing engagement with the base frame, and a second position vertically displaced from the first position. In the first position, the cap forms a sealed enclosure for protecting contents loaded onto the base frame. In the second position, the cap is raised to facilitate loading and unloading of the contents as well as to permit access to loaded contents from substantially any location around the perimeter of the trailer.

11 Claims, 5 Drawing Sheets

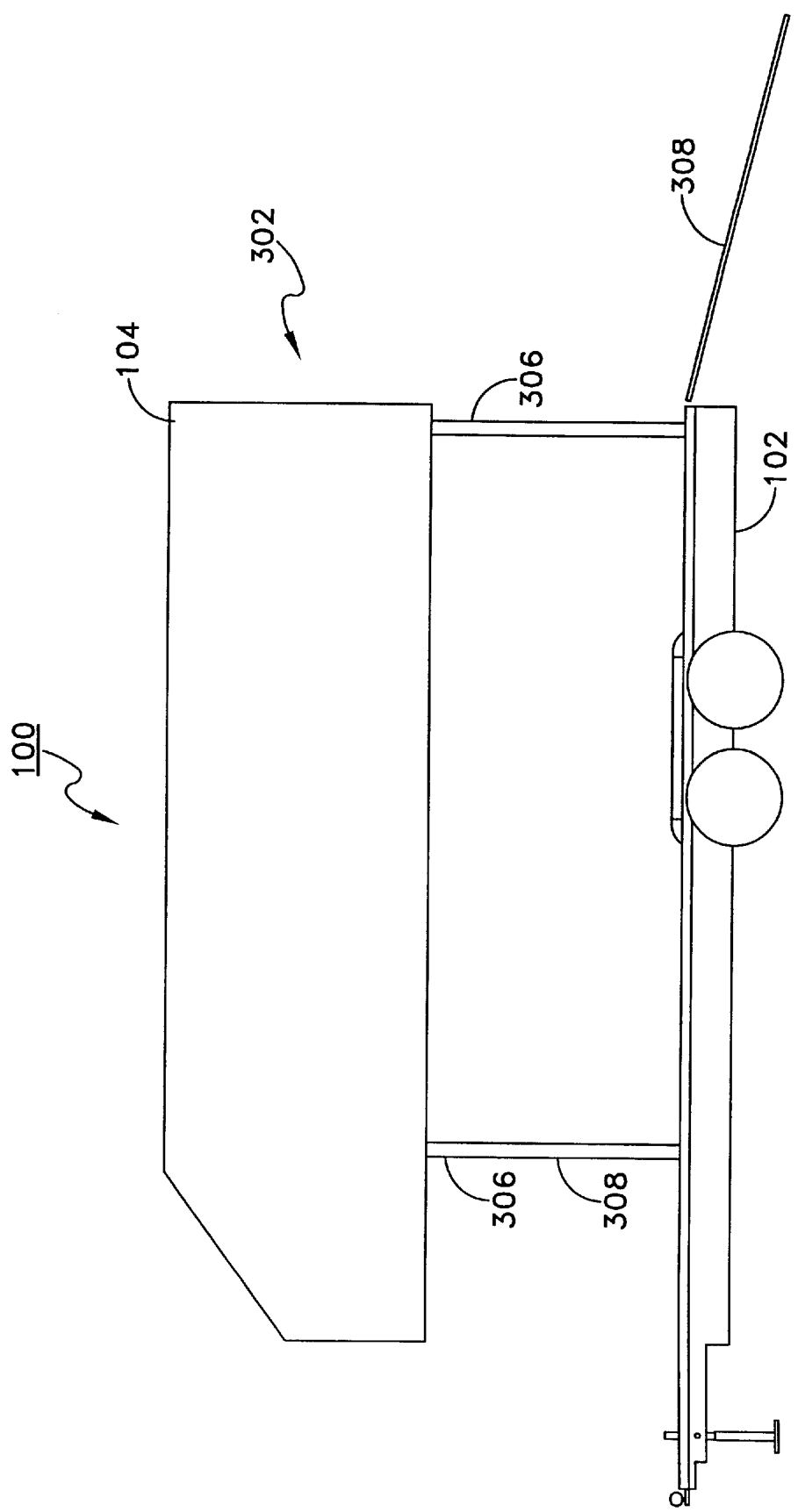

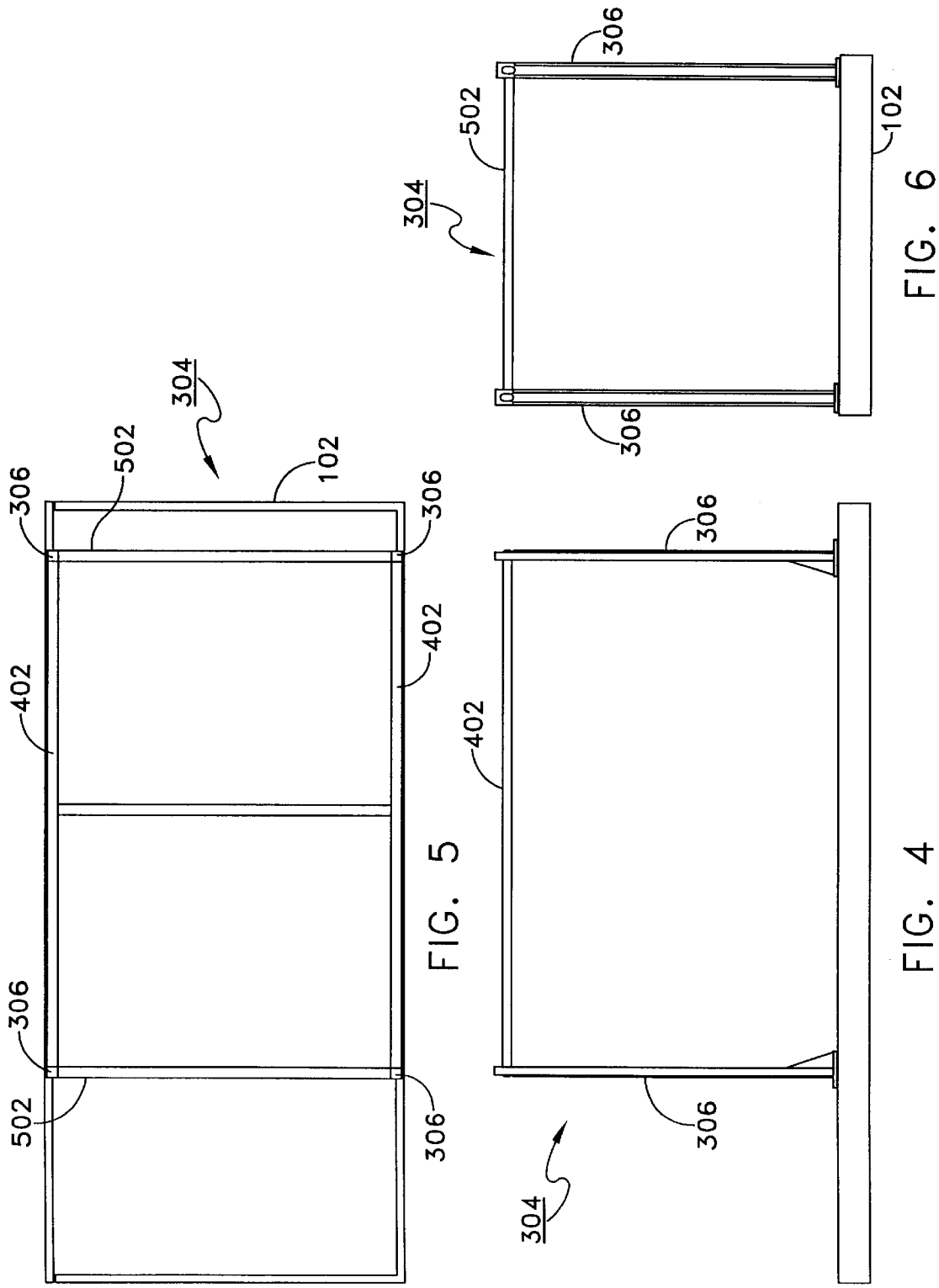

POP-UP TRAILER

BACKGROUND OF THE INVENTION

1. Field of the Invention

The present invention relates to trailer vehicles and more particularly to enclosures for utility trailers.

2. Description of Related Art

Utility trailers are vehicles which are typically coupled to trucks or cars and are used to transport various types of loads including automobiles and motorcycles. When transporting automobiles and motorcycles, it is desirable to have the trailer enclosed particularly when transporting vintage or classic vehicles. The enclosure will protect the transported vehicles from potentially harmful road debris as well as the weather, while providing security to minimize theft and vandalism.

Present day utility trailers, having protective enclosures, typically include a trailer bed disposed on a chassis having an undercarriage including an axle and wheels attached thereto. A hitch, for connecting the trailer to a towing vehicle, is attached to the front of the chassis. The protective enclosure is typically a box-like structure covering the trailer bed and secured to the chassis. The box-like structure consists of two side walls, a front wall, and a roof. The rear of the enclosure is usually formed by a door or doors which permit access to the interior of the enclosure.

To transport an automobile in one of the present day enclosed utility trailers, the rear door is opened and the automobile is driven, pushed or winched into the enclosure and secured to the trailer bed. Since the utility trailer is usually not much bigger that the automobile being transported, the person driving the vehicle onto the trailer exits the automobile with some difficulty due to the confined space within the enclosure. This confined space also makes it difficult to move around the automobile as required to secure it to the trailer for transport.

Therefore it is desirable to have a utility trailer which affords the protective benefit of an enclosure while enabling freedom of movement around the contents to be transported.

SUMMARY OF THE INVENTION

A utility trailer comprising a base frame having wheels attached thereto and a cap. The cap is moveable between a first position in sealing engagement with the base frame, wherein the cap forms a sealed enclosure for protecting contents loaded onto the base frame, and a second position vertically displaced from the first position to facilitate loading and unloading of the contents as well as to permit access to loaded contents from substantially any location around the perimeter of the trailer.

BRIEF DESCRIPTION OF THE DRAWINGS

FIG. 3 is a side elevation view of the embodiment of the utility trailer shown in FIG. 1 depicting the protective cap in a second position, vertically displaced from the first position.

FIG. 4 is a side elevation view of an embodiment of a lifting frame mounted on the base frame of the utility trailer of the present invention.

FIG. 5 is a top view of the embodiment of the lifting frame mounted on the base frame of the utility trailer depicted in FIG. 4.

FIG. 6 is an end view of the embodiment of the lifting frame mounted on the base frame of the utility trailer depicted in FIG. 4.

DETAILED DESCRIPTION

Figure 1:
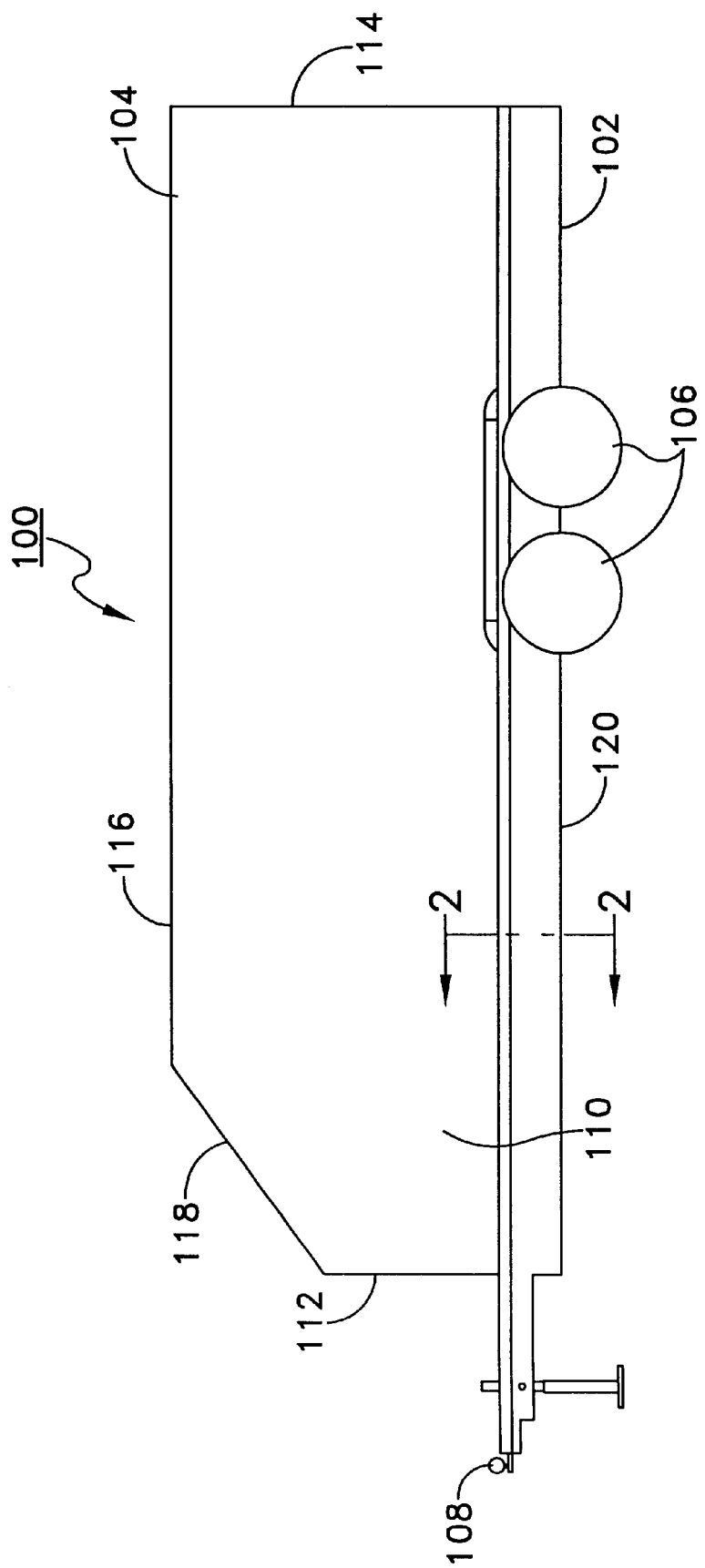
FIG. 1 is a side elevation view of an embodiment of a utility trailer of the present invention including a base frame and a protective cap depicted in a first position in sealing engagement with the base frame.

Referring to FIG. 1, there is shown a side elevation view of an embodiment of a utility trailer of the present invention generally referred to as 100. The utility trailer 100 comprises a base frame 102 and a protective cap 104. The protective cap 104 is depicted in a first position in sealing engagement with the base frame 102. The cap 102 has two sidewalls 110 (only one depicted in FIG. 1), a front wall 112, a rear wall 114 and a roof 116. It is preferred that the cap 102 be formed as a single piece to minimize the occurrence of breaches in the protective covering afforded by the cap as might occur in seams where individually formed walls and roof are joined together. However, caps which are constructed using individually formed walls and roof which are carefully joined together to minimize joint defects are within the scope and contemplation of the present invention.

It is also preferred that the cap be constructed using fiberglass. However, other materials such as weldable plastics or other composites, aluminum, or a combination of aluminum and composites may also be used to construct the cap and such materials are considered to be within the scope and contemplation of the present invention. The purpose of the cap 104 is to enclose and protect the contents of the trailer 100. Thus the shape of the cap 102 depicted in FIG. 1, with hard corners and a sloping roof portion 118 is merely exemplary. Other shapes suitable for enclosing and protecting the trailer contents, for example those with rounded corners, or without the sloping roof portion 118, or shapes designed to reduce drag are considered to be within the scope and contemplation of the present invention.

The base frame member 102 preferably includes frame members, collectively referred to as 120, extending around the periphery thereof. In addition to frame members 120, the base frame includes other structural members as required to support the maximum load to be carried by the trailer as is known in the art. The base frame 102 has a set of wheels 106 attached to the underside thereof. FIG. 1 depicts a configuration having four wheels on two axles. However, the trailer may also be configured with two wheels on a single axle; four wheels on a single axle; eight wheels on two axles; or other configurations as required to support the maximum load to be carried by the trailer as is known in the art. The trailer 100 also includes a hitch 108 and an adjustable front support 110 which are attached to the front end of the base frame 102 as is known in the art. In FIG. 1, the cap 104 is depicted in a first position in sealing engagement with the base frame 102.

Figure 2:
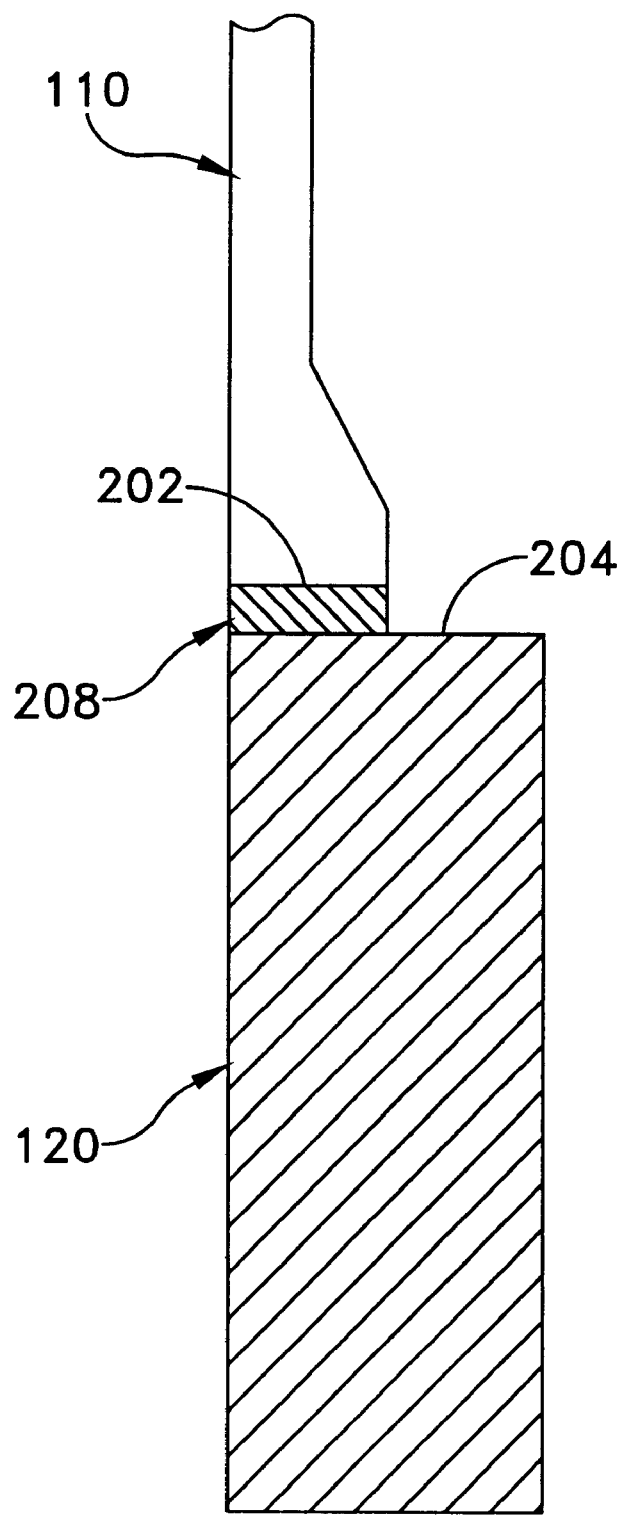
FIG. 2 is a partial sectional view taken along lines 2—2 of FIG. 1.

Referring now to FIG. 2, there is shown a partial sectional view taken along lines 2—2 of FIG. 1. As shown in FIG. 2, with the cap 104 in the first position, a lower surface 202 of the sidewall 110 of the cap 104 is seated on an upper surface 204 of a frame member 120 of the base frame 102, with a gasket 208 disposed between the lower surface 202 of the cap sidewall 110 and the upper surface 204 of the frame member 120 of the base frame 102. This arrangement is continued around the periphery of the base member 102 whereby the lower surfaces of the other sidewall, the front wall and the rear wall (not shown) are seated on the upper surfaces of the other frame members (not shown) with the gasket 208 disposed therebetween.

Referring now to FIG. 3, there is shown a side elevation view of the embodiment of the utility trailer 100 shown in FIG. 1 depicting the protective cap 104 in a second position, generally referred to as 302, vertically displaced from the first position depicted in FIG. 1. Vertical displacement of the cap 104 enables things to be hauled by the trailer to be loaded and unloaded onto the base frame 102 and enables access to those things which have been loaded from substantially any location around the perimeter of the trailer. It should be noted that the height of the vertical displacement between the first and second positions is adjustable depending upon the size if the things to be loaded and unloaded and the extent of the access required.

A lifting frame 304 is attached to the base frame 102. The lifting frame 304 includes four lift posts 306, two of which are shown in FIG. 3. Although four lift posts are depicted, there could be more than four, for example there could be six, and such is considered to be within the scope and contemplation of the present invention. The lifting frame 304 forms part of a mechanism for lifting and lowering the cap 104 between the first position depicted in FIG. 1 and a second position vertically displaced from the first position, for example second position 302. As shown in FIGS. 4 and 6, the lower end of each lift post 306 is attached to the base frame 102. As shown in FIGS. 4 and 5, the lifting frame 304 also includes two top side members 402. The ends of each top side member 402 are attached to a respective lift post 306 proximate the top end thereof. As shown in FIGS. 5 and 6, the lifting frame 304 further includes two top end members 502. The ends of each top end member 502 are attached to a respective lift post 306 proximate the top end thereof. As shown in FIG. 5, the lifting frame 304 additionally includes a top middle member 504. The ends of the top middle member 504 are attached to a respective top side member 402 at approximately the midpoint thereof.

Figure 7:
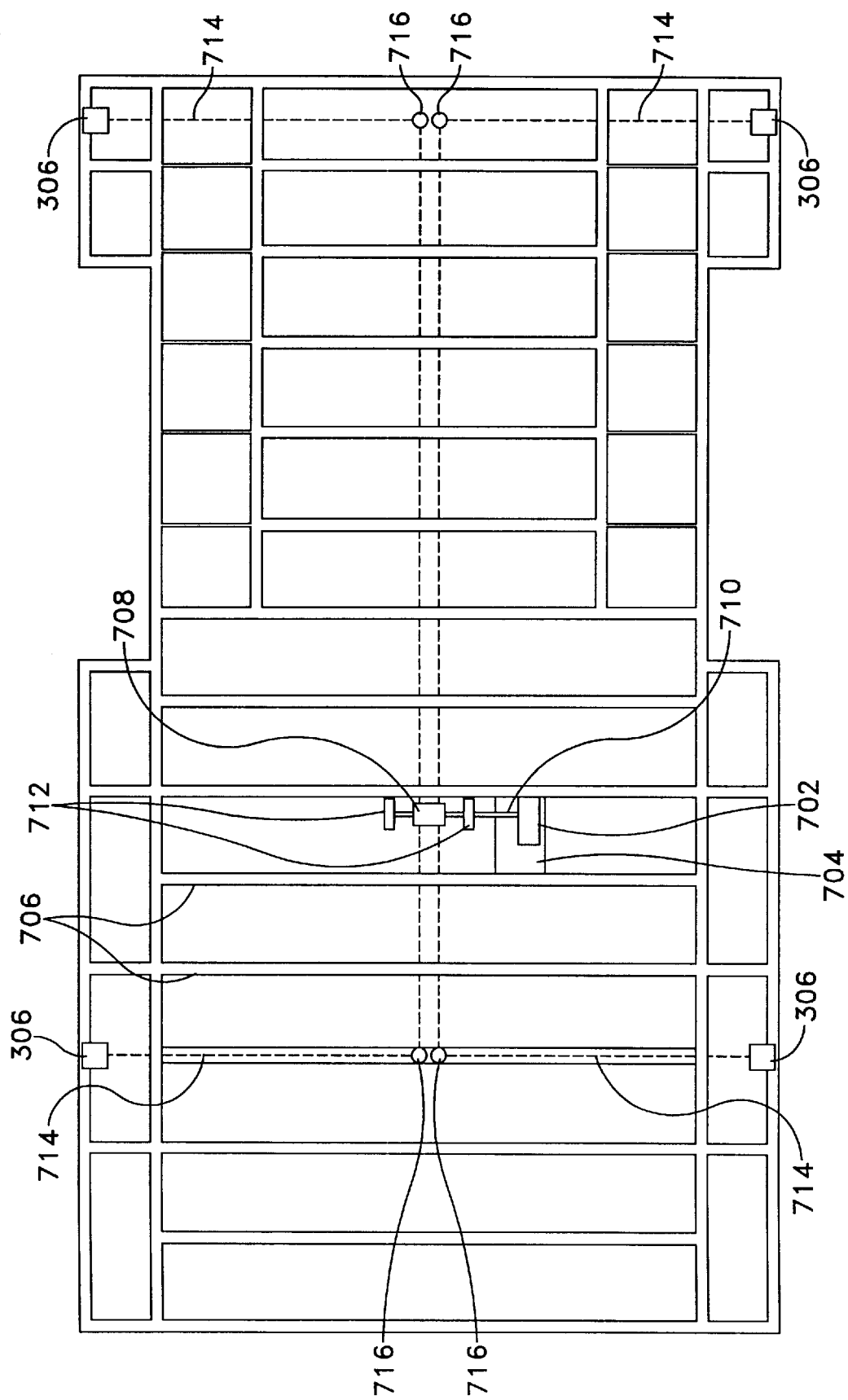
FIG. 7 is a top view of the base frame of the utility trailer of the present invention depicting a portion an embodiment of the mechanism for lifting and lowering the cap between the first and a second position vertically displaced from the first position.

Referring to FIG. 7, there is shown a top plan view of an embodiment of the base frame 102 of the utility trailer 100. A lifting mechanism, generally designated 700, includes a winch 702 attached to a winch mount 704 which is attached to lateral members 706 of the base frame 102. The winch 702 is connected to a winch reel 708 through a drive rod 710. The winch reel 708 is connected to the drive rod 710 between two pillow blocks 712. One end of each of four cables 714 is wrapped around the winch reel 708. Each cable 714 extends around a respective first pulley 716 attached to the base frame 102; around a respective second pulley (not shown) and upwardly through a respective lift post 306; and around a respective third pulley attached to the respective lift post 306 proximate the upper end thereof (not shown). The other end of each cable 714 is attached to an inner portion of the cap 104 proximate the bottom portion of a respective corner thereof (not shown).

The utility trailer 100 of the present invention operates as follows. During transport, the utility trailer 100 is configured as shown in FIG. 1 with the cap 104 positioned in sealing engagement with the base frame 102. Thus the cap 104 protects the trailer contents from dirt and road debris as well as the weather. Loading and unloading contents will now be described using an automobile as an exemplary load. To load the automobile, the cap 104 is raised from the seated position depicted in FIG. 1 to the raised position depicted in FIG. 3 using the lifting mechanism 700. The winch 702 of the lifting mechanism 700 is operated causing the winch reel 708 to rotate which in turn causes the cables 714 to wrap around the winch reel 708 causing the cables 714 to be taken up. Since the other ends of the cables 714 are led around their respective pulleys and up an through the lifting posts 306 with their ends attached to respective corners of the cap 104, the cap 104 will raise as the cables 714 are taken up around the winch reel 708.

The winch 702 may be operated by an electric motor (not shown) or by a hand crank (not shown) or by an electric motor with a hand crank back up, all of which are within the scope and contemplation of the present invention. If the winch 702 is operated by an electric motor, lifting the cap 104 can be halted at a predetermined height by a limit switch as is known in the art. It should be noted that the cap 104 can be lifted and lowered hydraulically by hydraulic cylinders positioned at the corners of the cap 104. The hydraulic would be extended and contracted, lifting and lowering the cap 104, using a hydraulic pump as is known in the art. The hydraulic pump could be operated electrically and/or manually.

Once the cap 104 is lifted to the desired vertical height as shown in FIG. 3, a ramp or ramps 308 are positioned between the end of the trailer base frame 102 and the ground to enable the automobile to be driven onto the base frame 102. For utility trailers designed to transport automobiles, it is preferred that there be two ramps 308, one each for the left and right wheels, which ramps are stored within the trailer base frame 102. Once the automobile is driven into place on the trailer base frame 102, the driver exits the automobile which is then secured to the base frame 102 for transport as is known in the art.

Because this loading operation takes place with the cap 104 in the raised position in accordance with the present invention, and because this configuration enables substantially unimpeded access to the loaded vehicle from around the entire perimeter of the trailer 100, the driver can easily exit the vehicle and the vehicle can be secured to the trailer 100 by tie-downs or other means known in the art without hindrance caused by the confined space available within the fixed protective enclosures of the prior art. Once the vehicle has been loaded and secured to the trailer base frame 102, the protective cap 104 is lowered into sealing engagement with the base frame 102 by reversing the operation of the winch 702 of the lifting mechanism 700. The cap 104 is then secured to the base frame 102 by clamps or other devices known in the art, and the trailer, with its contents loaded, is ready for transport.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A utility trailer comprising:
   a) a base frame having wheels attached thereto;
   b) a cap, moveable, by means of a lifting/lowering mechanism, between a first position in sealing engagement with said base frame, wherein said cap and said base frame form a sealed enclosure for protecting contents loaded onto said base frame, and a second position vertically displaced from said first position, said lifting/lowering mechanism comprising:
      i) a lifting frame including at least four lift posts extending upwardly from said base frame;

ii) a winch having a reel; and iii) at least four cables, each cable extending from said winch reel through a respective lift post with the end remote from the winch reel attached to said cap, whereby rotation of the winch reel in a first direction causes said cap to raise from said first position to said second position, and rotation of said winch reel in a second direction, opposite to said first direction, causes said cap to lower from said second position to said first position.

2. The utility trailer in accordance with claim 1 wherein said cap is constructed of a weldable composite material.

3. The utility trailer in accordance with claim 2 wherein said cap is constructed of a weldable plastic material.

4. The utility trailer in accordance with claim 1 wherein said cap is constructed of aluminum.

5. The utility trailer in accordance with claim 1 wherein said cap is constructed of a combination of aluminum and a weldable composite material.

6. The utility trailer in accordance with claim 1 wherein said cap includes a lower surface extending around the periphery thereof which lower surface is seated on said base frame with a gasket disposed therebetween when said cap is in said first position.

7. The utility trailer in accordance with claim 1 wherein said winch is driven by an electric motor.

8. The utility trailer in accordance with claim 1 wherein said winch is manually operated.

9. The utility trailer in accordance with claim 1 additionally comprising at least one ramp, stored in said base frame, to facilitate the loading and unloading of vehicles having wheels including automobiles, motorcycles and all terrain vehicles.

10. The utility trailer in accordance with claim 1 additionally comprising means for securing said cap to said base frame when said cap is in said first position.

11. The utility trailer in accordance with claim 10 wherein said means for securing said cap to said base frame comprises at least one clamp attached between said base frame and said cap.

* * * * *